US008057082B2

(12) United States Patent
Seabrook

(10) Patent No.: US 8,057,082 B2
(45) Date of Patent: Nov. 15, 2011

(54) MULTIPLE AXES ADJUSTABLE LIGHTING SYSTEM

(75) Inventor: William J. Seabrook, Toronto (CA)

(73) Assignee: Aimrail Corporation, Ontario (CA)

( * ) Notice: Subject to any disclaimer, the term of this patent is extended or adjusted under 35 U.S.C. 154(b) by 141 days.

(21) Appl. No.: 12/525,520

(22) PCT Filed: Feb. 1, 2008

(86) PCT No.: PCT/CA2008/000211

§ 371 (c)(1), (2), (4) Date: Feb. 11, 2010

(87) PCT Pub. No.: WO2008/092271

PCT Pub. Date: Aug. 7, 2008

(65) Prior Publication Data

US 2010/0135007 A1 Jun. 3, 2010

(51) Int. Cl.
*B60Q 1/00* (2006.01)

(52) U.S. Cl. ........ 362/547; 362/523; 362/525; 362/294; 362/287; 174/16.3

(58) Field of Classification Search .................. 362/523, 362/525, 285, 287, 269, 294, 545, 547; 174/16.3
See application file for complete search history.

(56) References Cited

U.S. PATENT DOCUMENTS 5,857,767 A * 1/1999 Hochstein ..................... 362/294
6,517,218 B2 * 2/2003 Hochstein ..................... 362/294
6,999,318 B2 2/2006 Newby
7,093,952 B2 * 8/2006 Ono et al. ..................... 362/194
7,114,837 B2 * 10/2006 Yagi et al. ..................... 362/523
7,325,955 B2 * 2/2008 Lucas et al. ................... 362/545
7,371,964 B2 * 5/2008 Albou et al. ................. 174/16.3
7,607,806 B2 * 10/2009 Hayashi et al. ............... 362/427
7,771,095 B2 * 8/2010 Dorogi .......................... 362/373
7,985,013 B2 * 7/2011 Yasuda ......................... 362/547
2005/0254263 A1 11/2005 Harwood
2006/0215416 A1 * 9/2006 Lucas et al. ................... 362/545

FOREIGN PATENT DOCUMENTS

CA 2496937 3/2004
CA 2591569 6/2005
WO 2007006130 1/2007
WO 2008092271 8/2008

* cited by examiner

*Primary Examiner* — Ali Alavi

(74) *Attorney, Agent, or Firm* — Daniel A. Thomson; Emerson Thomson Bennett, LLC

(57) ABSTRACT

A lighting assembly includes a thermally conductive mounting having a mounting surface is provided. The lighting assembly further includes a thermally conductive carriage having a front and a rear surface. The rear surface of the carriage is moveably mounted to the front surface of the mounting. A heat sink seat having a front and a rear surface is moveably mounted to the front surface of the carriage. A light emitting device may be attached to the front surface of the heat sink seat. In use, the carriage is moveable along a first axis and the heat sink seat is moveable along a second axis, the first axis and second axis being substantially transverse.

20 Claims, 11 Drawing Sheets

MULTIPLE AXES ADJUSTABLE LIGHTING SYSTEM

FIELD OF THE INVENTION

The present invention relates to lighting assemblies, and more particularly to lighting assemblies for light emitting diode (LED) arrays.

BACKGROUND OF THE INVENTION

Light emitting diodes (LEDs) are generally more energy efficient, more reliable and have longer lifetimes than other types of lighting. One performance measure of an LED is its photometric efficiency, e.g. the conversion of input energy into visible light. Photometric efficiency is inversely proportional to the junction temperature of an LED. Junction temperature also affects the operational lifetime of LEDs. Accordingly, keeping the LED junction temperature cool is an important consideration in the design of LED devices.

Traditionally, heat dissipation of LEDs was provided by the lead wires of the LED itself. However, this technique is inefficient and limits the efficiency of LED devices. Another method for controlling LED junction temperature uses a heat sink slug to draw heat away from the LED. An example of such an apparatus is described in U.S. Pat. No. 6,274,924 to Carey et al., issued Aug. 14, 2001. An LED die is attached to the heat sink slug using a thermally conductive material or submount. The heat sink slug is inserted into an insert-molded leadframe. The heat sink slug may include a reflector cup. Bond wires extend from the LED to metal leads on the leadframe. The metal leads are electrically and thermally isolated from the slug. An optical lens may be used to focus the light emitted from the LED. This apparatus is useful for dissipating heat from the LED, however it requires that the heat be dissipated to air. This problem becomes exacerbated with high wattage LEDs and multiple LED devices where heat generation is greater. A solution to the external heat dissipation is not provided by the apparatus of Carey et al.

Control and focus of the light emitted from an LED is typically provided using a collimator such as those described in U.S. Pat. No. 6,547,423 to Marshall et al., issued Apr. 15, 2003. A collimator uses a lens and refractive walls to focus the light emitted from an LED. An LED and collimator combination yields a high level of efficiency in terms of control of emitted light or luminous flux.

The aiming of individual light sources so that the object or area of interest is properly lit is an important consideration. A known method of aiming individual light sources is an arrangement commonly referred to as a gimble ring. Gimble rings are known in the art and are commonly used in track lighting. Gimble rings work well with incandescent lights and other light sources that do not depend on a thermal circuit at the back of the lighting assembly. However, gimble rings are not suitable for light sources that require a thermal circuit at the back because the ring arrangement lacks the required surface area. Further, gimble ring-type arrangements are not appropriate for use in small spaces, for example, where clearance around the light source is limited or where several light sources are to be used close together.

Thus, it would be desirable to have a lighting assembly for an LED that provides adequate heat dissipation for single LED applications, high wattage LEDs and multiple LED devices. Also desirable is a lighting assembly for LEDs and other light sources requiring a thermal circuit at the rear which provides for the aiming of individual light sources.

SUMMARY OF THE INVENTION

The present invention is a lighting assembly, heat sink, and heat recovery system therefor that may be used for mounting LEDs including higher wattage LEDs and multiple LED devices. Some embodiments of the present invention also provide a mechanism for the aiming of individual light sources that may be used in tight spaces and with light sources requiring a thermal circuit at the rear. Some embodiments also provide for linear LED arrays to be used.

In an aspect, provided is a lighting assembly, comprising: a thermally conductive mounting having a front surface; a thermally conductive carriage having a front and rear surface; said rear surface of said carriage being moveably mounted to said front surface of said mounting, wherein the shape of the rear surface of the carriage corresponds to the shape of the front surface of the mounting; and a heat sink seat having a front and rear surface, said rear surface of said heat sink seat being moveably mounted to said front surface of said carriage, wherein the shape of front surface of the carriage corresponds to the shape of the rear surface of said heat sink seat, wherein the front surface of said heat sink seat is configured to receive a light emitting device; wherein in use, said carriage is moveable along a first axis and the heat sink seat is moveable along a second axis, said first axis and second axis being substantially transverse.

In an embodiment, the lighting assembly further comprises a light emitting device having a light emitting diode (LED) thermally coupled to the front surface of said heat sink seat.

In an embodiment, the light emitting device is a Luxeon Star LED.

In an embodiment, the light emitting device is a Golden Dragon LED.

In an embodiment, the rear surface of said heat sink seat forms a convex surface and the front surface of the carriage forms a concave surface, and wherein the radius of said convex surface of said heat sink seat corresponds to the radius of said concave surface of said carriage.

In an embodiment, the rear surface of said carriage forms a convex surface and the front surface of the mounting forms a concave surface, and wherein the radius of said convex surface of said carriage corresponds to the radius of said concave surface of said mounting.

In an embodiment, the mounting, the carriage and the heat sink seat are formed of aluminum.

In an embodiment, the lighting assembly the mounting defines an indexing channel for mounting the carriage, and the carriage further includes a carriage indexer at the rear surface thereof, the carriage indexer being received in the indexing channel of said mounting.

In an embodiment, the carriage defines an indexing channel for mounting said heat sink seat, and the heat sink seat further includes an indexer at the rear surface thereof, the indexer of the heat sink seat being received in the indexing channel of said carriage.

In an embodiment, the indexing channel of the carriage includes a proximal and a distal limit position defined by the respective ends of said indexing channel, wherein said heat sink seat is moveable between said proximal and distal limit positions.

In an embodiment, the indexing channel of said carriage is a lateral channel.

In an embodiment, the mounting defines a plurality of the indexing channels corresponding to a plurality of the heat sink seats.

In an embodiment, the indexing channels of said mounting includes an upper and lower limit position defined by the respective ends of said indexing channel, wherein said carriage is moveable between said upper and lower limit positions.

In an embodiment, the indexing channel of said carriage is a transverse indexing channel.

In an embodiment, the lighting assembly further comprises a collimator attached to the front surface of said heat sink seat, wherein said collimator is positioned to focus light emitted from said LED.

In an embodiment, the lighting assembly further comprises: a plurality of LEDs thermally coupled to the front surface of the heat sink seat; plurality of collimators including a lens attached to the front surface of the heat sink seat, wherein each the lens is operably positioned over one LED in the plurality of LEDs for focusing the light emitted therefrom.

In an embodiment, the lighting assembly further comprises a heat sink slug thermally connected to the LED and thermally coupled to the front surface of the heat sink seat.

In an embodiment, the lighting assembly further comprises a thermally conductive substrate having a top and bottom surface, wherein the top surface of the substrate is thermally connected to the heat sink slug, and wherein the bottom surface of the substrate is thermally connected to the front surface of the heat sink seat.

In an embodiment, the surface area of the bottom surface of the thermally conductive substrate is sufficient to create an effective thermal circuit.

In an embodiment, the radius of the concave surface of the carriage is equal to or greater than the distance from the rear surface of the heat sink seat to a top surface of the collimator.

In an embodiment, the lighting assembly further comprises a longitudinally extending thermally conductive housing defining an aperture on a first wall thereof, and wherein the mounting includes a mounting portion, and wherein the mounting portion is thermally connected to the housing, and wherein the LED may be aimed through the aperture at an area or object to be illuminated.

In an embodiment, the mounting further includes a rearward side and a plurality of longitudinally extending fins extending from the rearward side of the mounting.

In an embodiment, the lighting assembly further comprises a longitudinally extending thermally conductive housing defining an aperture on a first wall thereof, and wherein the mounting includes a mounting portion, and wherein the mounting portion is thermally connected to the housing, and wherein the LED may be aimed through the aperture at an area or object to be illuminated.

In an embodiment, the mounting further includes a rearward side and a plurality of longitudinally extending fins extending from the rearward side of the mounting.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Figure 1:
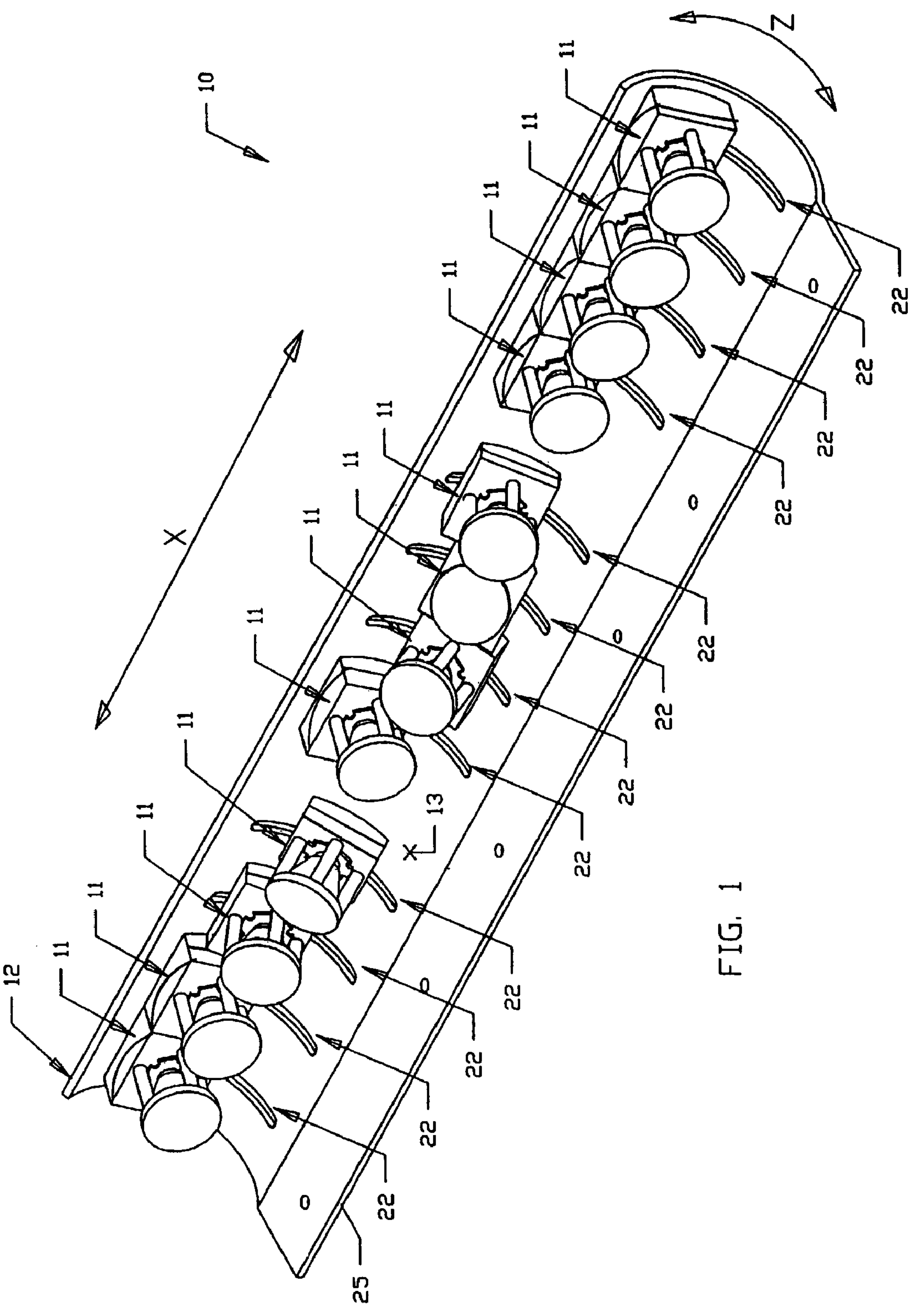
FIG. 1 is a perspective view of one embodiment of a lighting assembly according to the present invention.
Figure 2:
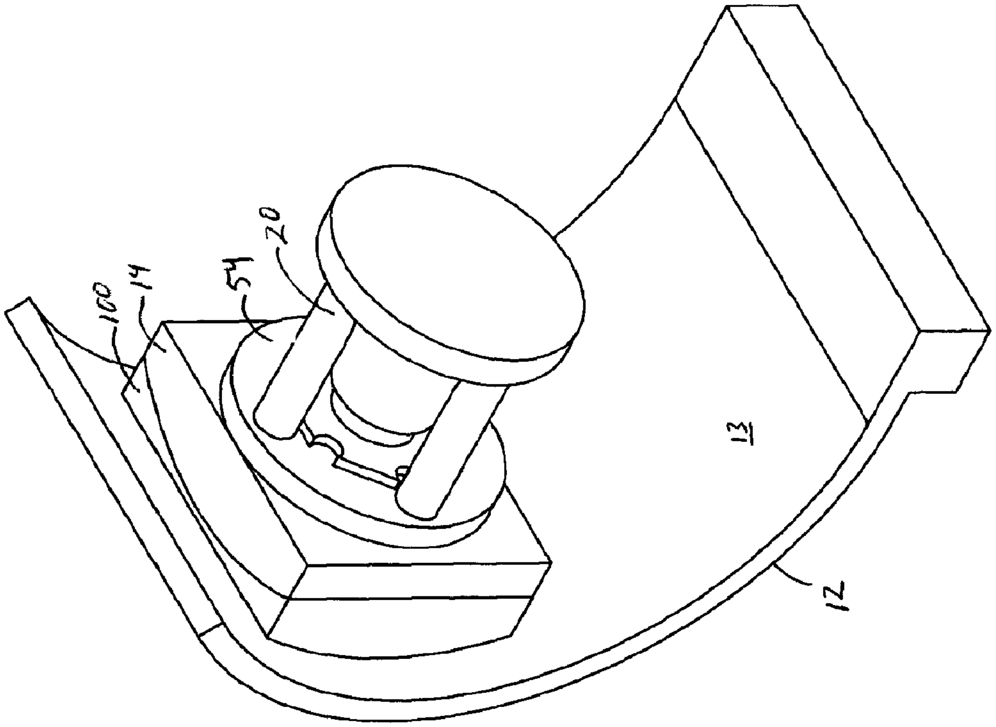
FIG. 2 is a perspective view of the lighting assembly of FIG. 1.

Similar references are used in different figures to denote similar components.

DETAILED DESCRIPTION OF THE EMBODIMENTS

Referring to FIG. 1 to 4, a lighting assembly 10 according to present invention will be described. The lighting assembly 10 comprises a thermally conductive mounting 12 having a mounting surface 13 and a plurality of light emitting diode (LED) modules 11 mounted along its major axis (X). Each LED module 11 comprises a thermally conductive carriage 100 including a front surface 112 and a rear surface 110, a heat sink seat 14 including a front surface 33 and rear surface 34, LED subunit 16 including an LED 18, and collimator 20. The thermally conductive mounting 12 is elongate and defines indexing channels or slots 22 for mounting the LED modules 11.

The mounting 12 may be constructed of aluminum or other suitable thermally conductive material such as copper or steel. The length of the mounting 12 may be varied to accommodate as many LED modules 11 as are desired for a particular lighting application. Typically, the indexing channels 22 are spaced such that the LED modules 11 are close together in groups or arrays. In other embodiments, the indexing channels 22 are spaced apart to provide a desired distance between the LED modules 11. In another embodiment, only one LED module 11 and indexing channel 22 are provided. In the present embodiment, the mounting surface 13 is a concave surface with the mounting 12 forming a trough.

Figure 4:
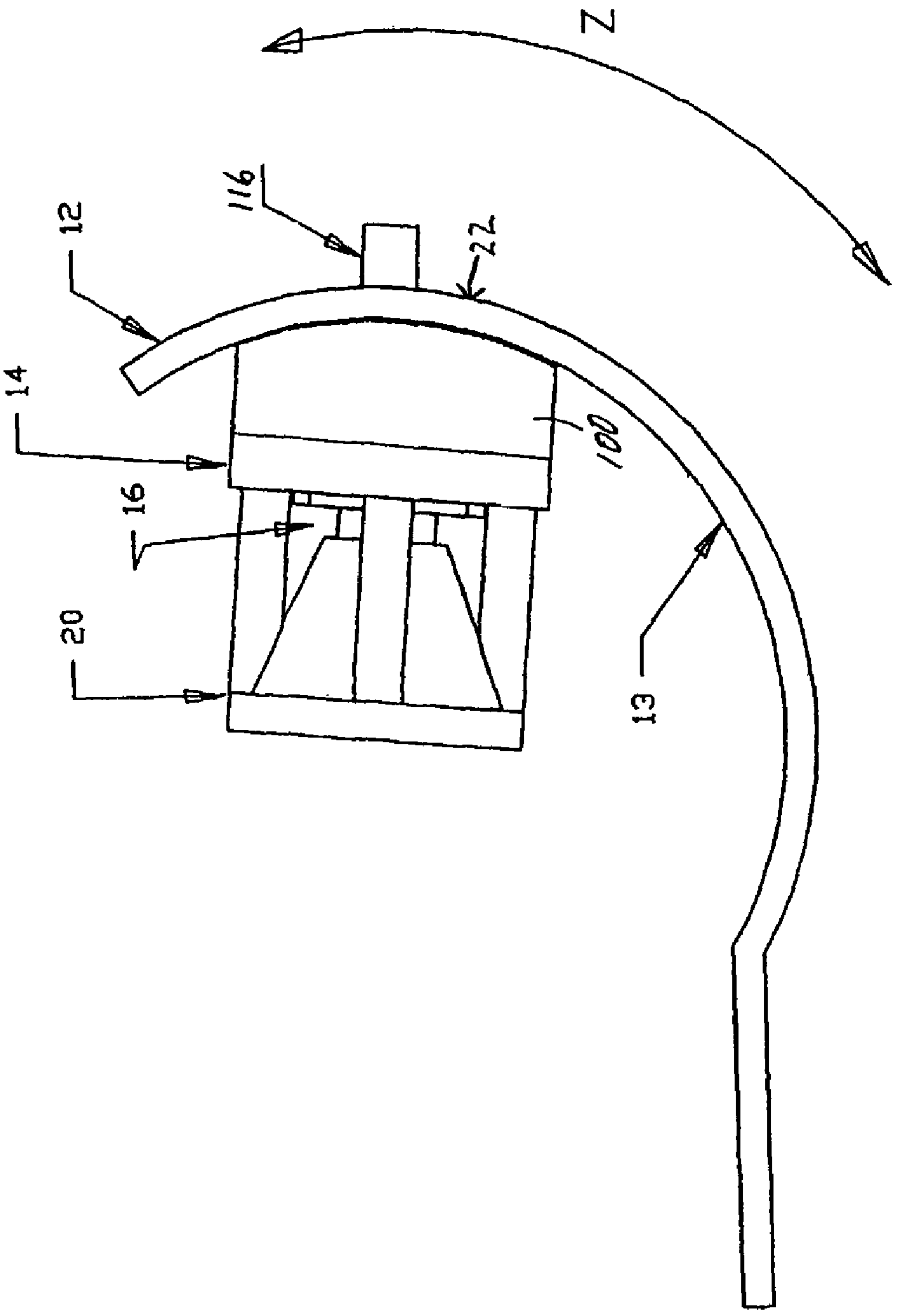
FIG. 4 is a side view of the lighting assembly of FIG. 1.

Carriage 100 is moveably mounted to mounting surface 13 of mounting 12. The carriage 100 may also be constructed of aluminum or other suitable thermally conductive material such as copper or steel. As shown in FIG. 4, in an embodiment, the rear surface 110 of the carriage 100 is a convex surface corresponding in shape and dimension with the concave surface of mounting surface 13. The radius of the mounting surface 13 corresponds with the radius of the convex surface 110 of the carriage 100 to provide a thermal circuit of sufficient surface area to adequately dissipate the heat generated from the operation of the LEDs 18. The radius of the mounting surface 13 should be equal to or greater than the length of carriage 100. Different shapes for the rear surface 110 of the carriage 100 and the mounting surface 13 may be used provided the surfaces match and form a contact area sufficient for an effective thermal circuit when the carriage 100, heat sink seat 14 and the LED modules 11 are mounted. Typically, a thermally conductive surface wetting component such as thermal grease is used to improve surface contact between the rear surface 110 of the carriage 100 and the mounting surface 13.

Figure 6:
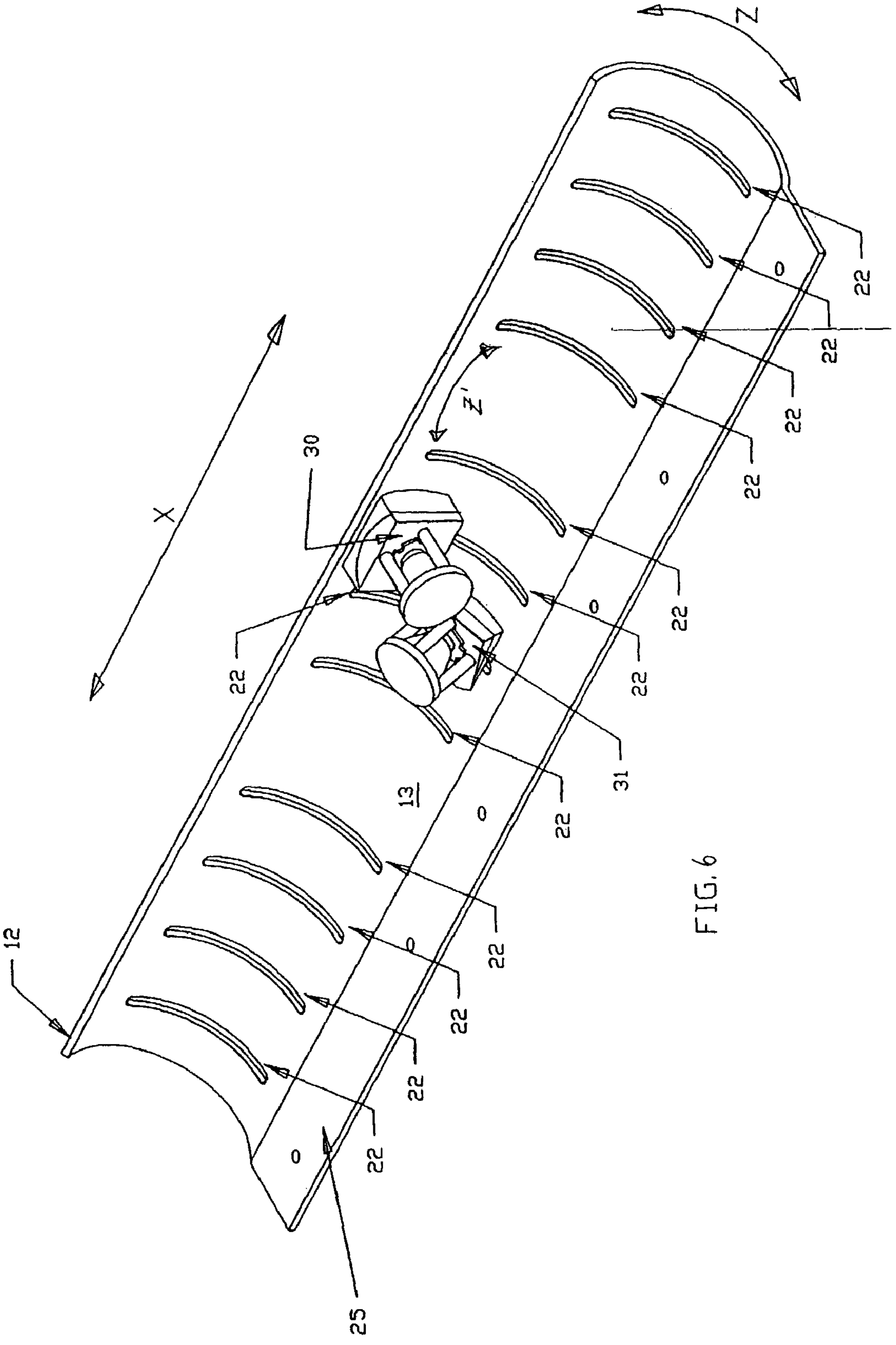
FIG. 6 is a perspective view of the lighting assembly of FIG. 1 showing a flat and a wedge shaped LED module in isolation.
Figure 10:
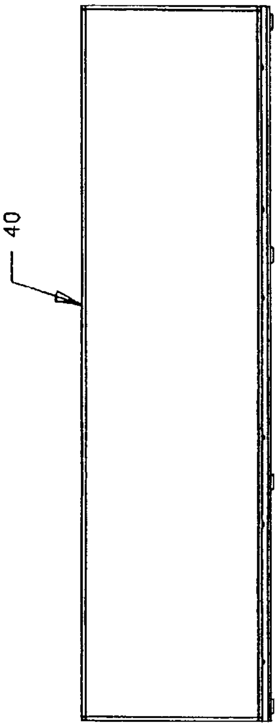
FIG. 10 is a top view of the housing of FIG. 7.
Figure 9:
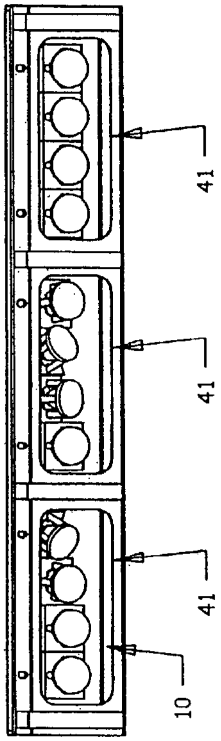
FIG. 9 is a front view of the housing of FIG. 7.
Figure 7:
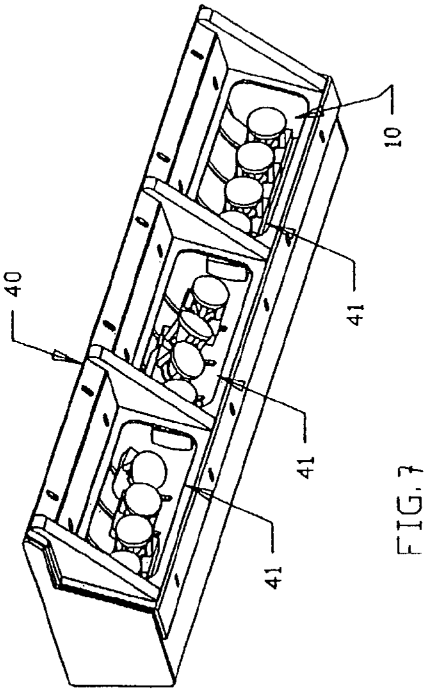
FIG. 7 is a perspective view of a housing containing the lighting assembly of FIG. 1.
Figure 8:
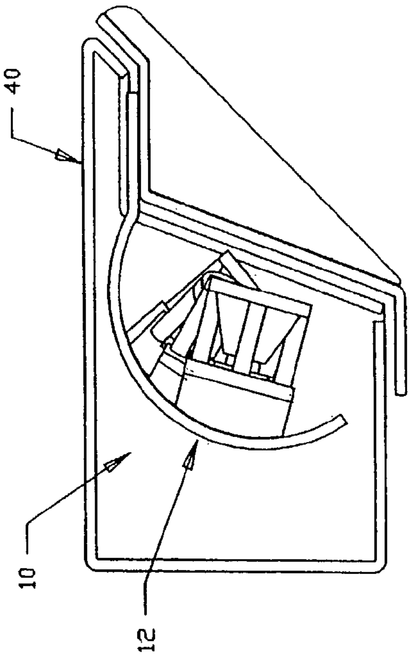
FIG. 8 is a side view of the housing of FIG. 7.

The heat sink seats 14 may be constructed of aluminum or other suitable thermally conductive material such as copper or steel. As shown in FIG. 6, the front surface 33 of the heat sink seats 14 may be flat 30 or angled 31 forming what is referred to as either a flat heat sink seat or an angle heat sink seat respectively. When mounted, the flat front surface 30 is substantially parallel to the major axis (X) of the mounting 12. In contrast, the angled front surface 31 is positioned at an angle to the major axis (X) of the mounting 12 when the heat sink seat 14 is mounted. Other shapes for the heat sink seats 14 are also possible. The heat sink seats 14 may be machined, cut, extruded, or otherwise formed. In one embodiment, the heat sink seats 14 are formed of extruded aluminum and have a flat front surface 30. If an angled front surface 31 is desired for some or all of the heat sink seats 14, the angled front surface 31 is subsequently machined from an extruded flat heat sink seat.

Figure 3A:
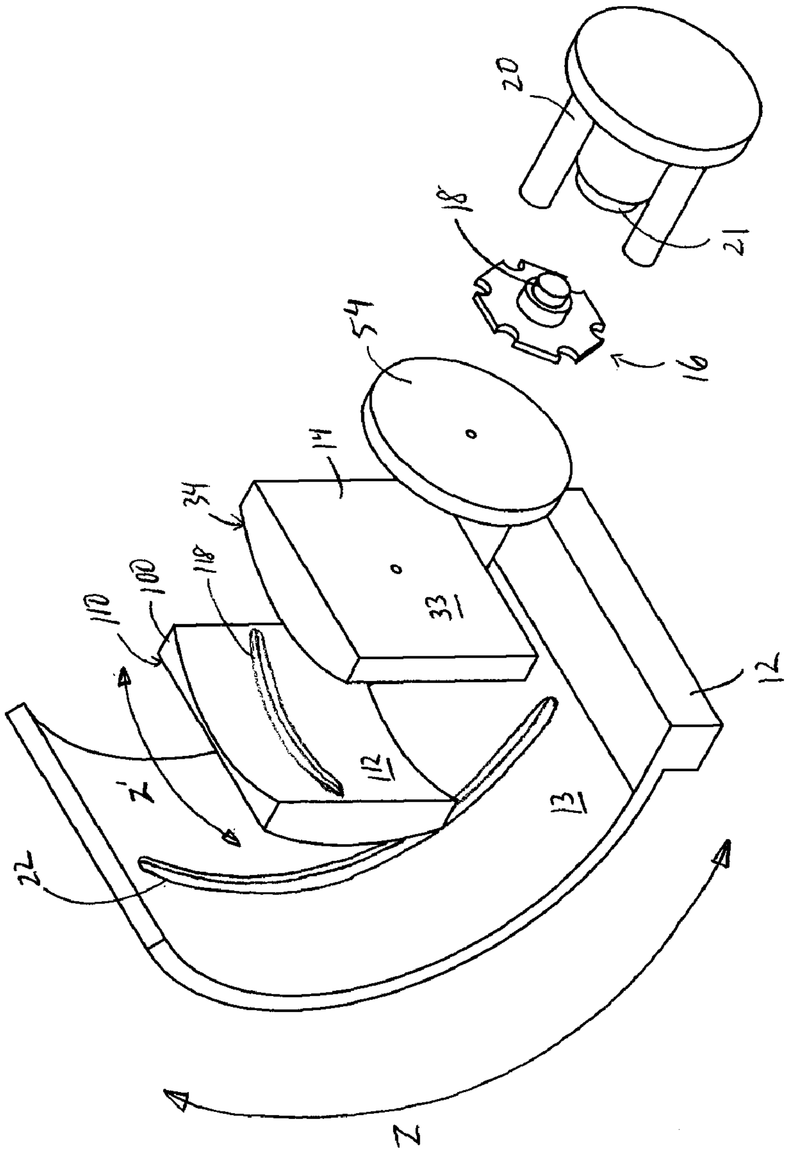
FIG. 3A is an exploded perspective view of a segment of the lighting assembly of FIG. 1.
Figure 3B:
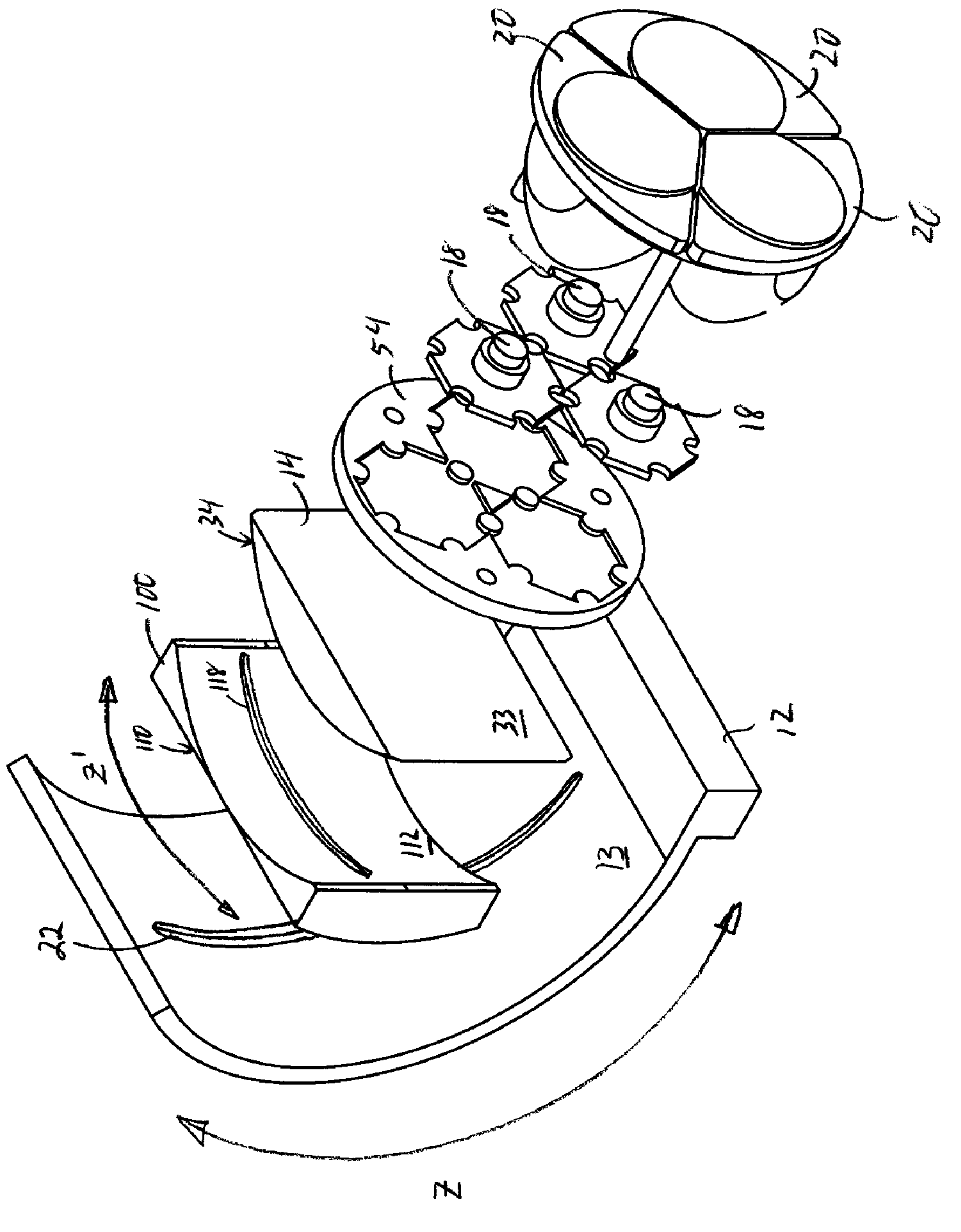
FIG. 3B is an exploded perspective view of a segment of the lighting assembly of FIG. 1 having a plurality of LED units.
Figure 5:
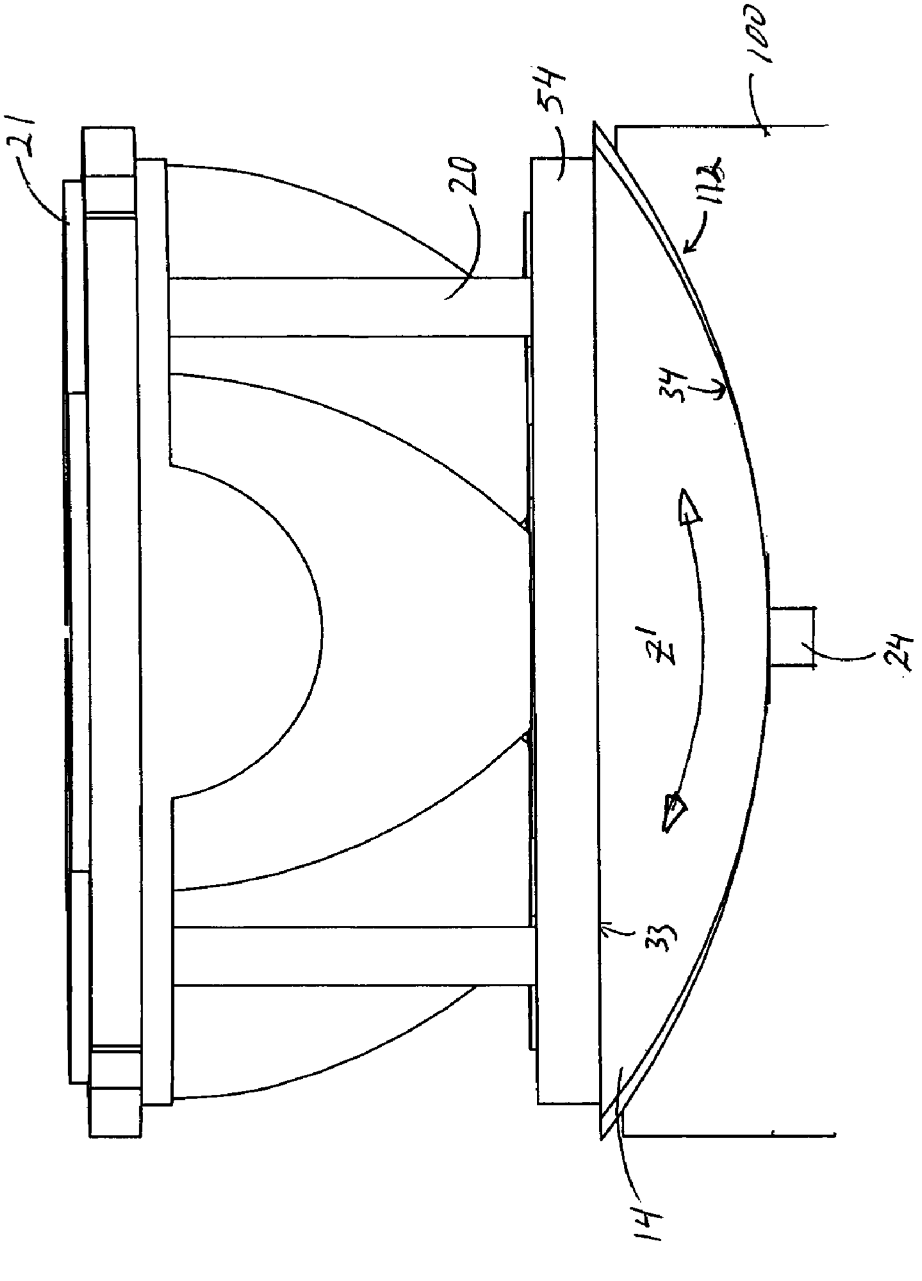
FIG. 5 is a partial side view of a LED module.

Heat sink seat 14 is moveably mounted to the front surface 112 of the carriage 100. As shown in FIGS. 5, 3B, and 3A, the front surface 112 of the carriage 100 is a concave surface corresponding in shape and dimension with the rear surface 34 of the heat sink seat 14. The radius of the carriage 100 corresponds with the radius of the convex surface 34 of the heat sink seat 14 to provide a thermal circuit of sufficient surface area to adequately dissipate the heat generated from the operation of the LEDs 18 (not shown). The radius of the carriage 100 should also be equal to or greater than the length of heat sink seat 14. Different shapes for the rear surface of the carriage and the heat sink may be used provided the surfaces match and form a contact area sufficient for an effective thermal circuit when the LED modules 11 are mounted. A thermally conductive surface wetting component such as thermal grease may also be used to improve surface contact between the front surface 112 of the carriage 100 and the rear surface 34 of the heat sink seat 14.

The LED modules 11 of light assembly 10 are moveable along a first axis generally transverse with the major axis (X) of the mounting 12. The heat sink seat 14, and, as a result the corresponding LED subunit 16 of each LED module is moveable along a second axis generally parallel with the major axis (X) of the mounting 12. Adjustability of the position of individual LED modules 11 in a first axis and adjustability of the position of the heat sink seat 14 in each of the individual LED modules 11 allows a user to more precisely aim or target the light source.

As shown in FIGS. 3A, 3B, and 4, the radius of the mounting surface 13 corresponds with the radius of the convex rear surface 110 of the carriage 100 thereby allowing the carriage 100 to slide along the length of a first indexing path (Z) while maintaining contact between the mounting surface 12 and the rear surface 110 of the carriage to ensure dissipation of heat generated by the LEDs. As shown in FIG. 4, each carriage 100 includes a carriage indexer 116 on its rear surface 110. The carriage indexer 116 may be attached to or formed integrally with the carriage 100. The carriage indexer 116 is received in a corresponding indexing channel 22 in the mounting 12. The carriage indexer 116 is used to position and secure the corresponding LED module 11 to the mounting 12 and to allow for movement of the LED module 11 along the first indexing path (Z). The carriage indexer 116 may be a threaded member adapted for receiving a nut. In some embodiments, the carriage indexer 116 is a screw which is threaded into the rear surface 34 of the heat sink seat 14. Other methods of fixing the carriage indexer 116 in the corresponding indexing channel 22 may also be used, for example, friction fits and cammed levers. Using the carriage indexer 116, an LED module 11 may be slid through a range of mounting positions provided by the indexing channels 22 until the desired mounting position for the LED module 11 is obtained. The first indexing path (Z) is limited by the upper and lower ends of the indexing channels 22 which define upper and lower limit positions for the LED modules 11 respectively. The LED modules 11 are moveable along the first indexing path (Z) within an axis which is substantially transverse to the major axis (X) of the mounting 12.

As shown in FIGS. 3A, 3B and 5, the radius of the front surface 112 of the carriage 110 corresponds with the radius of the convex rear surface 34 of the heat sink seat 14 thereby allowing the heat sink seat 14 to slide along the length of a second indexing path (Z') while maintaining contact between the front surface 112 of the carriage 100 and the rear surface 34 of the heat sink seat 14 to ensure heat dissipation. As shown in FIGS. 3A and 3B, each carriage 100 further defines indexing a channel 118 or slot 118 in the front surface 112 of the carriage 100 for mounting the heat sink seat 14. The indexing channel 118 or slot 118 is a generally lateral channel which bisects the carriage 100 in a direction substantially parallel to the major axis (X) of the mounting 12. As shown in FIG. 5, each heat sink seat 14 includes a heat sink seat indexer 24 on its rear surface 34. The heat sink seat indexer 24 may be attached to or formed integrally with the heat sink seat 14. The indexer 24 of each heat sink seat 14 is received in a corresponding indexing channel 118 in the carriage 100. The heat sink seat indexer 24 is used to position and secure the heat seat sink 14 and the LED subunit 16 to the carriage 110 to form the LED module 11. The heat sink seat indexer 24 allows for movement of the LED subunit 16 along the second indexing path (Z'). The heat sink seat indexer 24 may be a threaded member adapted for receiving a nut. In some embodiments, the heat sink seat indexer 24 is a screw which is threaded into the rear surface 34 of the heat sink seat 14. Other methods of fixing the heat sink indexer 24 in the corresponding indexing channel 22 may also be used, for example, friction fits and cammed levers. Using the heat sink seat indexer 24, a heat sink seat 14, and, as a result, the corresponding LED subunit 16 may be slid through a range of lateral mounting positions provided by the indexing channels 22 until the desired mounting position for the LED subunit 16 is obtained. The second indexing path (Z') is limited by the proximal and distal ends of the indexing channel 118 which define proximal and distal limit positions for the LED subunit 16 respectively. The LED subunits 16 are moveable along the second indexing path (Z') within an axis which is substantially parallel to the major axis (X) of the mounting 12.

Using the carriage indexer 116, an LED module 11 may be moved through a range of mounting positions provided by the indexing channels 22 in the mounting 12 along a first axis. Using the heat sink seat indexer 24, the LED subunit 16 of the LED module 11 may be independently moved through a range of mounting positions provided by the indexing channels 118 in the carriage 100 along a second, transverse axis, until the desired mounting position for the LED subunit 16 is obtained (see FIG. 6). Thus, the LED module 11 module can be positioned along a first transverse axis and the LED subunit positioned along a second lateral axis for precise targeting of the light source. In this manner, indexing of the LED modules 11 allows the lighting assembly 10 to be customized to the lighting environment and conditions of a particular lighting task. Using the indexing mechanisms, LED modules 11 may be individually aimed as required to accomplish the lighting task. Various forms of indicia may be used to mark mounting positions or angles for the indexing channels 22 for ease of assembly. The indexing mechanism can also be used with non-LED light sources to aim or target individual light sources.

Figure 11:
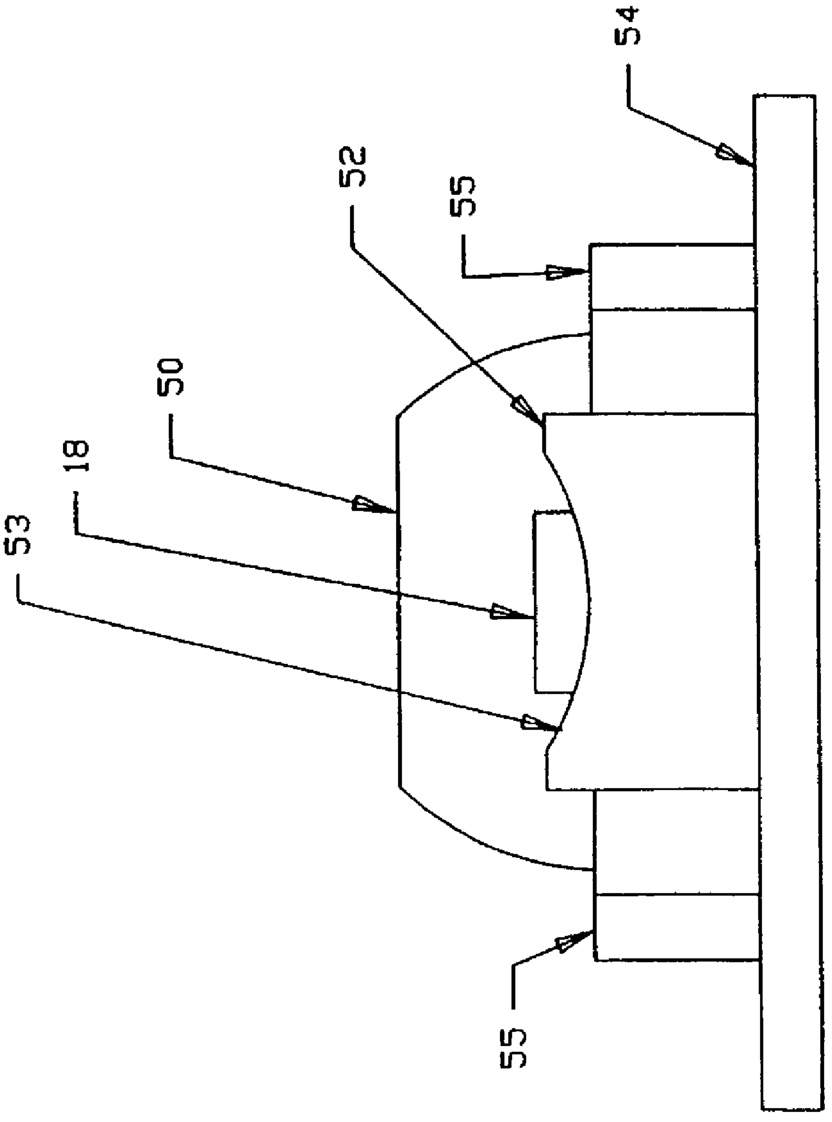
FIG. 11 is a side view of an LED subunit for the lighting assembly of FIG. 1.
Figure 12:
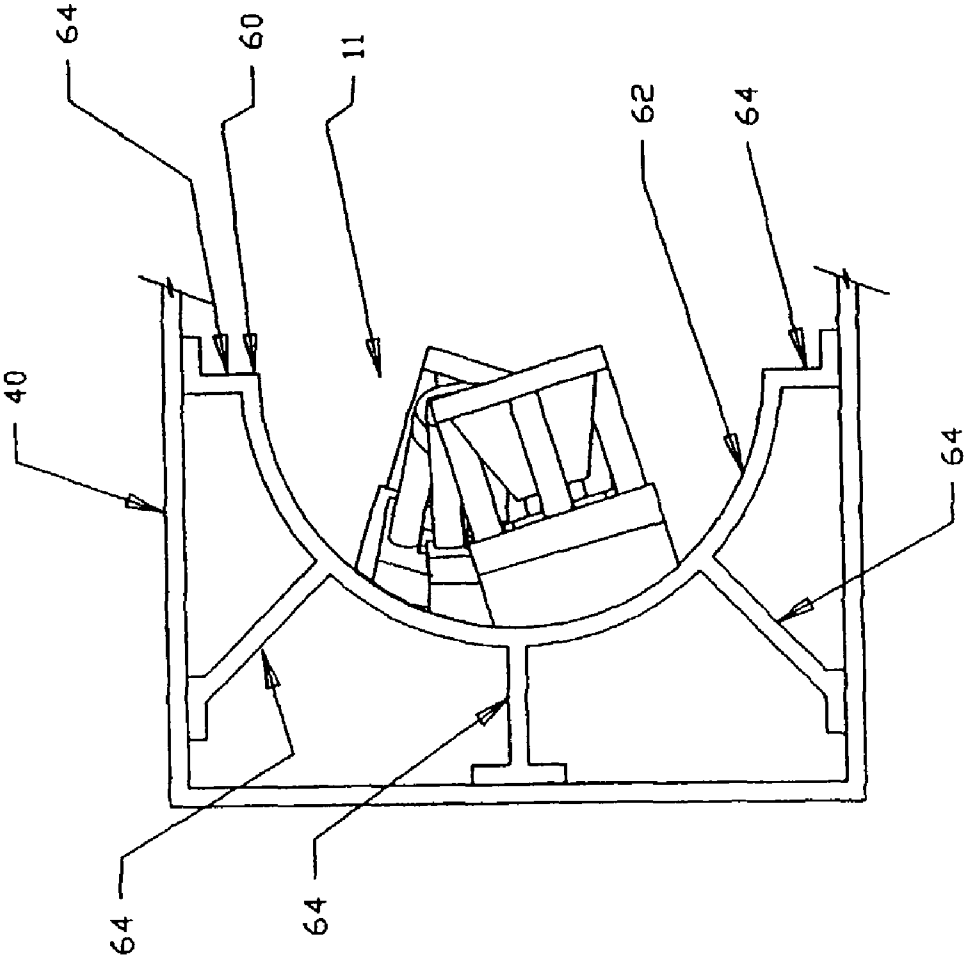
FIG. 12 is a side cross-sectional view of a second embodiment of a mounting for a lighting assembly according to the present invention.

Referring now to FIG. 11, an LED subunit 16 will be described in more detail. The LED subunit 16 comprises the LED 18, lens 50, a heat sink slug 52, and a thermally conductive substrate 54. Thermal epoxy or similar fixative is used to attach the LED 18 to the heat sink slug 52 and the heat sink slug 52 to the substrate 54. The heat sink slug 52 is constructed of a thermally conductive material such as aluminum and may include an optical reflector cup 53 which may be attached to or integrally formed with the heat sink slug 50. The reflector cup 53 may be made of thermally conductive materials such as aluminum that have been plated for reflectivity. The substrate 54 provides a large surface area for heat transfer in a thermal circuit. In some embodiments, the substrate 54 is part of a metal-core printed circuit board. In such cases, the circuit board includes electrical connections for the LED 18. In some embodiments, the LED subunits 16 are Luxeon™ LED light sources such as a Luxeon™ Star LED from Lumileds Lighting, LLC (San Jose, Calif., USA). Insulation 55 may be provided to shield the LED 18 and the heat sink slug 52. In other embodiments, the LED subunits 16 may be Golden Dragon® LED light sources from Osram GmbH (Rengenburg, Germany), Many different types of LEDs are known in the art. In some embodiments, the LED 18 is formed of a light-emitting diode die. Power consumption and colour of the light emitted are two considerations affecting the selection of an appropriate LED for a particular lighting application. In some embodiments, a 1 to 5 W LED is used. In other embodiments, a 1 to 3 W LED is used. In yet other embodiments, a 3 W LED is used.

Referring to FIG. 3A, typically, the light emitted from the LED 18 is focused to narrow its beam width. A collimator 20 having a lens 21 is attached to the heat sink slug to focus the light emitted therefrom. The collimator 20 is attached so that the lens 21 is close to and positioned over the LED 18. For some utility lighting applications, the light beam emitted from the LED 18 is focused to create a beam width of approximately 9 degrees. Many different types of collimators are known in the art. Examples of a collimator that may be used with the present invention are described in U.S. Pat. No. 6,547,423, issued Apr. 15, 2003. The collimator selected affects the properties of the light beam that is obtained. The LED 18 and collimator 20 should be properly selected to obtain the desired lighting characteristics for a particular lighting task.

Referring now to FIG. 3B, in other embodiments, the lighting assembly may comprise of a plurality of LED units mounted to a single carriage 100. In an embodiment as shown in FIG. 3B, the lighting assembly comprises three individual LED units, each LED unit comprising a LED 18, a lens 50 (not shown), a heat sink slug 52 (not shown), and a thermally conductive substrate 54. Each of the LED units is outfitted with a collimator as described above. The use of multiple LED units allow for greater variation in the amount of illumination provided by the lighting assembly.

Referring now to FIG. 7 to 10, a housing 40 for the lighting assembly 10 will be described. The housing 40 defines a plurality of apertures 41 which may be protected by a transparent cover (not shown). The housing 40 is made of a thermally conductive material such as steel or aluminum. A mounting portion 25 of the mounting 12 defines a number of holes which may be used to secure the lighting assembly 10 within the housing 40 using screws or other suitable fasteners. The mounting portion 25 thermally connects the mounting 12 and the housing 40 allowing the housing 40 to dissipate heat from the mounting 12 by conduction. Convection with outside air draws heat away from the housing 40.

Typically, the LED modules 11 are aimed through the apertures 41 at an area or object to be illuminated. Using the indexing mechanism described above, LED modules 11 may be individually aimed to direct the light emitted therefrom through a narrow aperture 41 or lens. The provision of a narrow aperture 41 reduces the overall required size of a lighting fixture, allowing smaller lighting fixtures with blocking light. The aperture may be made narrow without interfering with light emission and while allowing a great range of light aiming due to the concave configuration of mounting 12. Additional aiming of the LED modules 11 may be provided by using an angled heat sink seat rather than a flat heat sink seat. The housing 40 and protective cover (not shown) may be used to protect the lighting assembly 10 from rain, snow, dust, and other environmental elements when used for exterior lighting applications. The housing 40 and protective cover also protect against unwanted access, for example, for the safety of bystanders and to minimize or prevent tampering with the lighting assembly 10.

Figure 13:
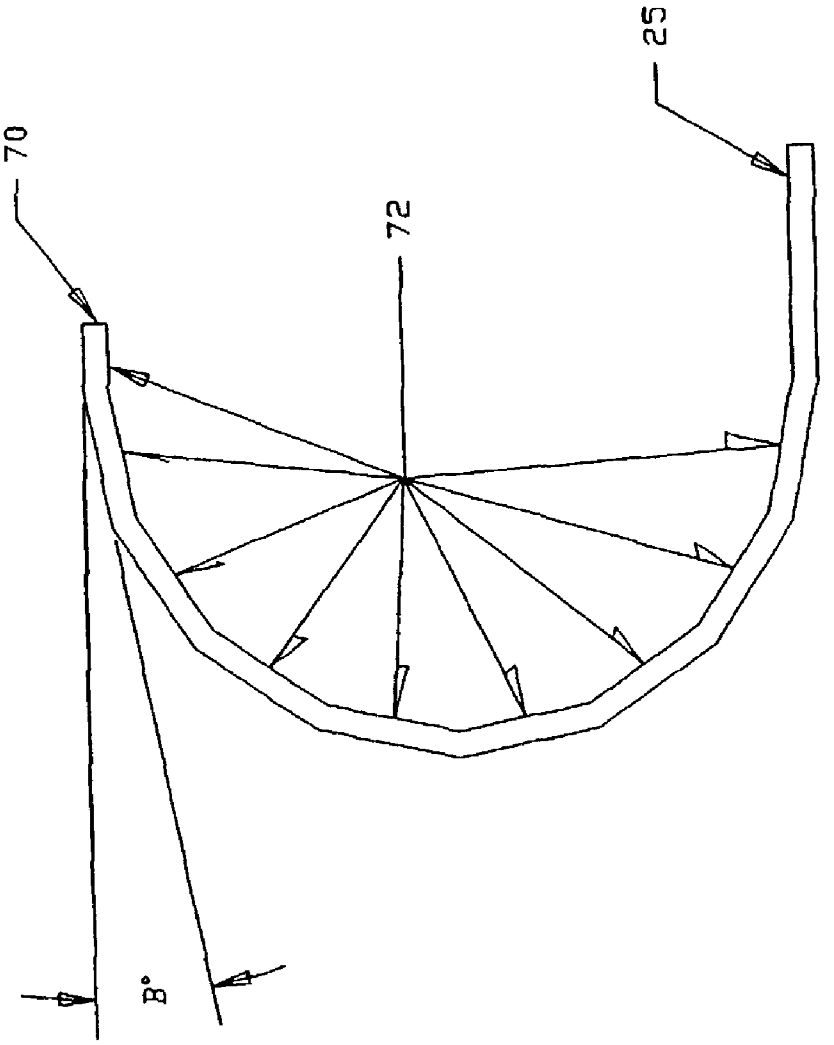
FIG. 13 is a side view of a third embodiment of a mounting for a lighting assembly according to the present invention.

Referring now to FIG. 13, a second embodiment of a mounting 60 for a lighting assembly will be described. The mounting 60 includes a mounting surface 62 similar to the mounting surface 13. The mounting 60 is similar to the mounting 12 in several respects, however the mounting 60 includes a plurality of longitudinally extending fins 64 on its rearward side. The fins 64 may be attached to the housing 40 to secure the mounting 60 using screws, rivets, or other suitable fasteners. The fins 64 increase the surface area of contact between the mounting 60 and the housing 40, increasing heat transfer and providing a more effective thermal circuit. The mounting 60 is preferable for higher power applications such as high wattage LEDs and/or multiple LED devices.

Referring to FIG. 14, a third embodiment of a mounting 70 for a lighting assembly will be described. The mounting 70 is similar to the mounting 12. The mounting 70 comprises a plurality of facetted members or facets 72. The facets 72 are thin, longitudinally extending members formed of a thermally conductive material such as aluminum or carbon steel. The facets 72 may be separate members attached in series using a thermally conductive adhesive or other suitable fastening means, or the facets 72 may be formed integral with one another, for example by using a hydraulic brake to shape a piece of base material. The facets 72 meet at a desired mating angle (B°). The mating angle between the facets 72 is selected to provide the desired range of indexing positions for mounting the LED modules 11. In one embodiment, a mating angle of 15° is used. As in previous embodiments, the rear surface 34 of the heat sink seats 14 must correspond in shape to the shape of the facets 72.

Generally, light emitted from the lighting assembly 10 is directed laterally towards an object or area to be illuminated. Depending on the aiming of the LED modules 11, the light beam may also be directed laterally and downwardly, or laterally and upwardly towards the object or area to be illuminated.

The lighting assembly of the present invention has many applications, including low mounted utility lighting. The lighting assembly 10 may be installed at levels much lower than that of typical light standards, for example, below a handrail for lighting an adjacent walkway or street. Other applications include the installation of the lighting assembly 10 in a ceiling recess to illuminate an area or object while hiding the fixture from plain view. The coupling of the LED 18 to a heat sink seat 14 and thermally conductive mounting 12 creates a thermal circuit for the LEDs 18 which maintains an LED junction temperature that is lower than is otherwise possible, improving reliability and performance of the LEDs 18 because the LEDs 18 are not subject to high thermal stress. Much of the heat generated by the LED 18 is ultimately transferred to the housing 40 where convection with outside air dissipates the heat.

Advantages of the lighting assembly of the present invention include the assembly is linear, modular, easy to manufacture, may be used in tight spaces, and provides flexibility in design. The lighting assembly provides a linear array of LEDs which are modular and may be added or removed, and individually aimed as desired. The assembly is also modular in that two or more lighting assemblies may be used for a particular lighting task and arranged as desired. The lighting assembly also provides many targetable (directional) lights which may be used in tight spaces where clearance around the light is limited.

Several variations of the lighting assembly of the present invention are possible. Minimal heat dissipation occurs from the mounting 12 by convection. If desired, appropriate openings may be defined in the housing 40 to allow air flow through the housing 40. In such cases, air flow may be increased using a fan to increase convection and heat dissipation from the mounting 12. In some embodiments other lights such as incandescent lights may be used with the invention. In some embodiments, two or more LED modules may be mounted within the same indexing channel. In other embodiments, the heat sink seats also include cooling fins. The cooling fins may be attached to or formed integrally with the heat sink seats. In yet other embodiments, two or more LEDs (same or different) may be coupled to one heat sink seat. In such cases, a collimator may be used for each LED. The collimators for each may be separate components or formed integrally with one another. Although the use of the lighting assembly has been described with reference to a horizontal orientation, it is also possible for the lighting assembly to be used vertically.

The lighting assemblies of the present invention have many applications, including exterior and utility lighting applications. In some embodiments, lighting assemblies of the present invention may be used for lighting applications in hazardous or flammable environments in so called explosion proof applications. Explosion proof applications are tightly regulated in many jurisdictions. The sealed environment and low external heat production provided by some embodiments of the lighting assembly of the present invention may be advantageous in such some explosion proof applications.

Although the present invention has been described with reference to illustrative embodiments, it is to be understood that the invention is not limited to these precise embodiments, and that various changes and modifications may be effected therein by one skilled in the art. All such changes and modifications are intended to be encompassed in the appended claims.

What is claimed is:

1. A lighting assembly, comprising:

a thermally conductive mounting having a front surface;

a thermally conductive carriage having a front and rear surface; said rear surface of said carriage being moveably mounted to said front surface of said mounting, wherein the shape of the rear surface of the carriage corresponds to the shape of the front surface of the mounting surface; and a heat sink seat having a front and rear surface, said rear surface of said heat sink seat being moveably mounted to said front surface of said carriage, wherein the shape of front surface of the carriage corresponds to the shape of the rear surface of said heat sink seat, wherein the front surface of said heat sink seat is configured to receive a light emitting device;

wherein in use, said carriage is moveable along a first axis and the heat sink seat is moveable along a second axis, said first axis and second axis being substantially transverse.

2. The lighting assembly as claimed in claim 1, further comprising a light emitting device having a light emitting diode (LED) thermally coupled to the front surface of said heat sink seat.

3. The lighting assembly as claimed in claim 2, further comprising a collimator attached to the front surface of said heat sink seat, wherein said collimator is positioned to focus light emitted from said LED.

4. The lighting assembly as claimed in claim 3, wherein the radius of said concave surface of the carriage is equal to or greater than the distance from the rear surface of said heat sink seat to a top surface of the collimator.

5. The lighting assembly as claimed in claim 2, further comprising a plurality of LEDs thermally coupled to the front surface of said heat sink seat;

plurality of collimators including a lens attached to the front surface of said heat sink seat, wherein each said lens is operably positioned over one LED in the plurality of LEDs for focusing the light emitted therefrom.

6. The lighting assembly as claimed in claim 1, wherein the rear surface of said heat sink seat forms a convex surface and the front surface of the carriage forms a concave surface, and wherein the radius of said convex surface of said heat sink seat corresponds to the radius of said concave surface of said carriage.

7. The lighting assembly as claimed in claim 6, wherein the rear surface of said carriage forms a convex surface and the front surface of the mounting forms a concave surface, and wherein the radius of said convex surface of said carriage corresponds to the radius of said concave surface of said mounting.

8. The lighting assembly as claimed in claim 1, wherein said mounting, said carriage and said heat sink seat are formed of aluminum.

9. The lighting assembly as claimed in claim 1, wherein said mounting defines an indexing channel for mounting said carriage, and wherein said carriage further includes a carriage indexer at the rear surface thereof, said carriage indexer being received in said indexing channel of said mounting.

10. The lighting assembly as claimed in claim 9, wherein said mounting defines a plurality of said indexing channels corresponding to a plurality of said heat sink seats.

11. The lighting assembly as claimed in claim 9, wherein said indexing channels of said mounting includes an upper and lower limit position defined by the respective ends of said indexing channel, wherein said carriage is moveable between said upper and lower limit positions.

12. The lighting assembly as claimed in claim 9, wherein said indexing channel of said carriage is a transverse indexing channel.

13. The lighting assembly as claimed in claim 1, wherein said carriage defines an indexing channel for mounting said heat sink seat, and wherein said heat sink seat further includes an indexer at the rear surface thereof, said indexer of said heat sink seat being received in said indexing channel of said carriage.

14. The lighting assembly as claimed in claim 13, wherein said indexing channel of said carriage includes a proximal and a distal limit position defined by the respective ends of said indexing channel, wherein said heat sink seat is moveable between said proximal and distal limit positions.

15. The lighting assembly as claimed in claim 13, wherein said indexing channel of said carriage is a lateral channel.

16. The lighting assembly as claimed in claim 1, further comprising a heat sink slug thermally connected to said LED and thermally coupled to the front surface of said heat sink seat.

17. The lighting assembly as claimed in claim 16, further comprising a thermally conductive substrate having a top and bottom surface, wherein the top surface of said substrate is thermally connected to said heat sink slug, and wherein the bottom surface of said substrate is thermally connected to the front surface of said heat sink seat.

18. The lighting assembly as claimed in claim 17, wherein the surface area of the bottom surface is sufficient to create an effective thermal circuit.

19. The lighting assembly as claimed in claim 1, further comprising a longitudinally extending thermally conductive housing defining an aperture on a first wall thereof, and wherein said mounting includes a mounting portion, and wherein said mounting portion is thermally connected to said housing, and wherein said LED may be aimed through said aperture at an area or object to be illuminated.

20. The lighting assembly as claimed in claim 1, wherein said mounting further includes a rearward side and a plurality of longitudinally extending fins extending from the rearward side of said mounting.

* * * * *